(12) United States Patent
Ruperto et al.

(10) Patent No.: US 7,382,317 B1
(45) Date of Patent: Jun. 3, 2008

(54) TWO-STAGE LOCATION SYSTEM

(75) Inventors: Netzer Arias Ruperto, Chula Vista, CA (US); Dante Galli, Vista, CA (US); Joseph Nebolon, Del Mar, CA (US)

(73) Assignee: GPS International Technologies, Inc., Bonita, CA (US)

( * ) Notice: Subject to any disclaimer, the term of this patent is extended or adjusted under 35 U.S.C. 154(b) by 0 days.

(21) Appl. No.: 11/588,576

(22) Filed: Oct. 26, 2006

(51) Int. Cl.
*G01S 1/08* (2006.01)
(52) U.S. Cl. ................... 342/386; 342/357.06
(58) Field of Classification Search ........... 342/357.06, 342/386, 457, 463–464; 455/456.1, 456.6
See application file for complete search history.

(56) References Cited

U.S. PATENT DOCUMENTS 5,485,163 A * 1/1996 Singer et al. ............... 342/457
5,554,993 A * 9/1996 Brickell ................. 342/357.07
5,914,675 A * 6/1999 Tognazzini ................. 340/989
6,480,147 B2 * 11/2002 Durst et al. ............ 342/357.07
7,039,358 B1 * 5/2006 Shellhammer et al. ..... 455/41.2
2003/0040272 A1 * 2/2003 Lelievre et al. ............ 455/3.06

* cited by examiner

*Primary Examiner*—Dao Phan
(74) *Attorney, Agent, or Firm*—Mintz, Levin, Cohn, Ferris, Glovsky and Popeo, P.C.

(57) ABSTRACT

Systems and methods are provided for two-stage location. In one implementation, there is provided a method for receiving a first location of a first radio, the first radio providing the first location of the first radio; using the received first location to determine when to transmit an activation command from a portable locator to a second radio, the second radio coupled to the first radio; and receiving at the portable locator a beacon transmitted to enable the portable locator to precisely locate the second radio and the coupled first radio.

21 Claims, 4 Drawing Sheets

TWO-STAGE LOCATION SYSTEM

BACKGROUND

I. Field

This application relates to a two-stage location system, method, and apparatus.

II. Background and Material Information

The location of objects, such as cars, trucks, trains, and even people, can be facilitated using radios equipped with Global Position System (GPS) equipment. For example, a truck may be equipped with a radio that transmits its current position determined using GPS. However, GPS equipment often provides location measurements without sufficient precision for locating an object. For example, if the GPS equipment is in a region with buildings, mountains, or other structures (e.g., such as in a dense urban area), multipath interference may result in imprecise location measurements. In addition, if the GPS equipment is not in view of a sufficient number of GPS satellites (e.g., four GPS satellites), the GPS equipment may provide imprecise location measurements. When GPS equipment is used indoors, it also suffers from precision problems. In situations where precise location measurements are desired, GPS may thus provide poor performance.

Assisted-GPS is an alternative to GPS. Assisted GPS describes a system where an outside source, such as an assistance server, helps a GPS receiver perform the tasks required to determine location. For example, a mobile phone may be equipped with a GPS engine for determining location. The GPS engine in the mobile phone may be "assisted" by an assistance server. The assistance server may use the public wireless network to provide the GPS-enabled mobile phone with information such as an initial location estimate and decoded GPS satellite information (e.g., ephemeris data and clock data). However, the assisted GPS approach is also susceptible to some of the problems mentioned above, such as multipath interference. As such, in situations where precise location measurements are desired, assisted GPS may also provide poor performance.

SUMMARY

This application relates to a two-stage location system, method, and apparatus.

In one aspect, systems, methods, and apparatus may receive a first location from a first radio, the first radio providing a first location of the first radio; use the received first location to determine when to transmit an activation command from a portable locator to a second radio, the second radio coupled to the first radio; and receive at the portable locator a beacon signal transmitted to enable the portable locator to precisely locate the second radio and the coupled first radio.

Implementations may include one or more of the following features: receiving the received first location as a location determined from GPS (Global Positioning System); receiving the first location from a wireless device including a GPS (Global Positioning System) engine, the first location determined with information provided by an assistance server coupled to a wireless network and the wireless device; transmitting the beacon as a signal in an ISM (Industry, Scientific, and Medical) band; receiving an address of the second radio, the address being selectable and comprising one or more of the following: a media access control address and an electronic serial number (ESN); implementing a dormant state to conserve power at the second radio; sending a command from the portable locator to the second radio, the command activating a sound to assist in locating the second radio; using a directional antenna at the portable locator to facilitate location of the second radio; sending, from the portable locator, a second location of the second radio, when the second radio is precisely located by the portable locator; and mapping, at a computer, the first location and the second location, and tracking the first and second locations.

It is to be understood that both the foregoing general description and the following detailed description are exemplary and explanatory only and are not restrictive. Further features, variations, and/or advantages may be provided in addition to those set forth herein.

DESCRIPTION OF THE DRAWINGS

These and other aspects of the application will be described in detail with reference to the following drawings.

DETAILED DESCRIPTION

The implementations set forth in the following description do not represent all implementations. Instead, they are merely some examples consistent with certain aspects related to the application. Wherever possible, the same reference numbers will be used throughout the drawings to refer to the same or like parts.

In one implementation, a first radio, such as a GPS-enabled mobile phone, may send, through a wireless network, a first location measurement indicative of the location of first radio. The first location measurement may be received at a portable locator so that the portable locator can determine when (and thus where) to transmit an activation command from a portable locator to a second radio, which is coupled and adjacent to the first radio. When the second radio receives the activation command from the portable locator, the second radio sends a beacon to enable the portable locator to "home in" on (i.e., precisely locate) the beacon and thus the second radio and the coupled first radio. For example, a user of the portable locator may use the first location measurement to determine the general location of the first and second radios, and then send an activation command in the vicinity of the first and second radios, so that the second radio activates its beacon. When the beacon is sent by the second radio, a user of the portable locator may move in the direction of the beacon until the portable locator homes in on the precise location of the beacon and, as such, the first and second radios. In some implementations, the portable locator includes a directional antenna for reception of the beacon signal to further enhance the location feature of the portable locator.

Figure 1:
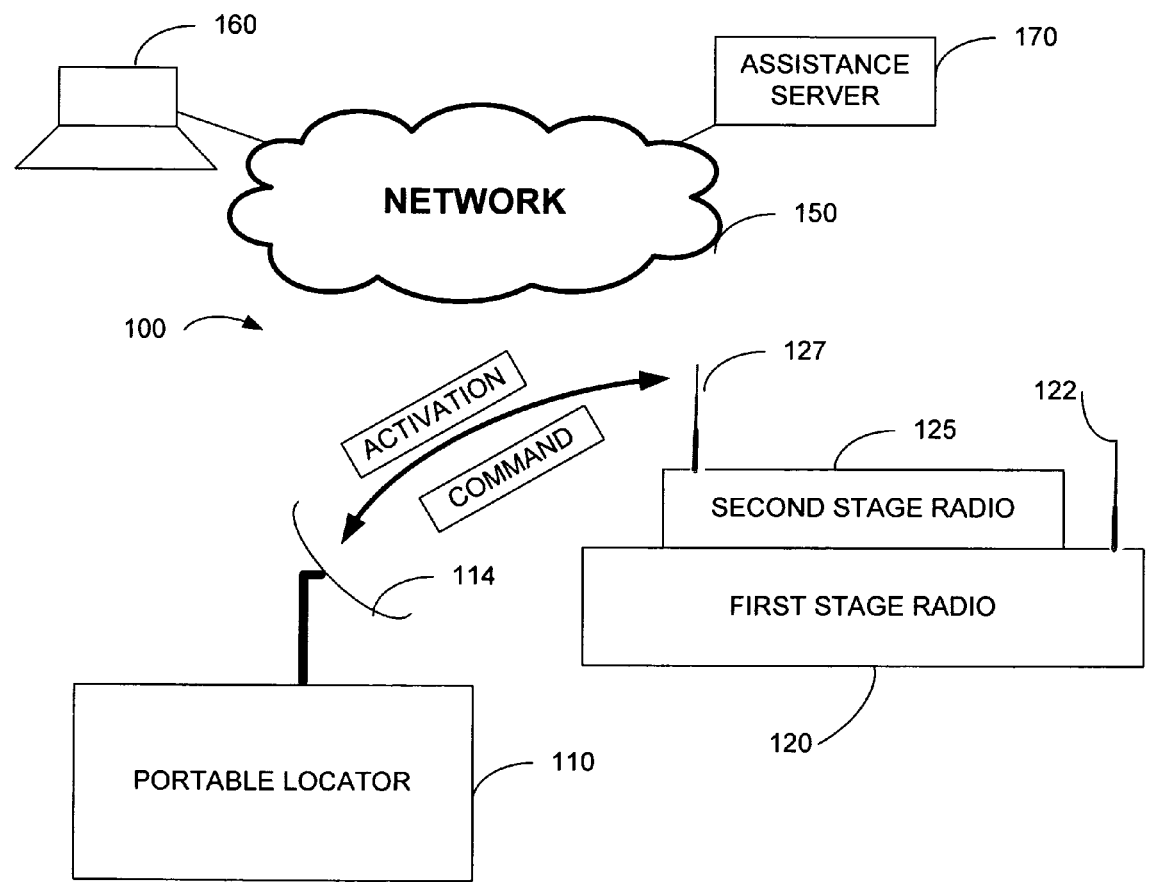
FIG. 1 illustrates a block diagram of an exemplary two-stage location system including a locator.

FIG. 1 illustrates a block diagram of an exemplary two-stage radio system 100. FIG. 1 depicts a portable locator 110, a first stage radio 120, a second stage radio 125, a network 150, and a controller, such as a computer 160.

First stage radio 120 may provide location information to another device, such as computer 160. First stage radio 120 may be implemented as a GPS (Global Positioning System) radio that determines location based on information received from one or more GPS satellites. First stage radio 120 may also include an antenna 122.

In some implementations, an assisted GPS radio (e.g., a wireless device or phone equipped with GPS) may be used as first stage radio 120. When that is the case, first stage radio 120 receives GPS satellite information from an assistance server 170 through a network 150 and antenna 122. Although network 150 is described as a wireless network, network 150 may be implemented as any type of network or communication mechanism.

The assistance server 170 assists first stage radio 120 determine its location by providing an initial location measurement to first stage radio 120, decoding any GPS information received directly from GPS satellites, and processing any GPS related information for first stage radio 120. In some cases, the use of assisted GPS as the first stage radio eliminates the requirement of having a clear line-of-sight from the first stage radio to at least four GPS satellites since the assistance server 170 supplements any missing information with its GPS information. The assistance server 170 may be located anywhere and in multiple locations. In some cases, one or more assistance servers provide information to nodes of a wireless network.

Second stage radio 125 may transmit a beacon to enable location by portable locator 110. The beacon may be transmitted at a variety of powers (e.g., 10 milliwatts to 1 watt) and a variety of frequencies (e.g., in an ISM (Industry, Scientific, and Medical) band, including 902 MHz to 928 MHz, 2.4 GHz to 2.4835 GHz, and 5.725 GHz to 5.850 GHz bands), although any portion of the spectrum used for communications may be used. In some implementations, second stage radio 125 transmits the beacon when activated by an activation command. For example, portable locator 110 may transmit a beacon including an activation command and an identifier (e.g., an address) that activates a second stage radio having that identifier or address.

The beacon of second stage radio 125 may be a signal modulated to carry information, such as an address, command, status information, or the like. For example, the beacon may carry an address, such as a media access control (MAC) address or a phone number, for the second radio and/or the first radio. In some implementations, the address is selectable. To further assist in locating the second radio 125, the portable locator may, in some implementations, send a command to activate a buzzer or a light at the first radio or the second radio.

The two-stage radio location system uses two-stages. The first stage radio 120 provides a first location measurement that is sufficient to give a general location for first and second stage radios 120 and 125. The second stage radio 125 emits a beacon to enable portable locator 110 to home in on the location of the beacon. In some implementations, portable locator 110 may send an activation command to activate the beacon in second stage radio 125, which may be in a dormant state listening until it receives the activation command.

As noted, the location measurement provided by first stage radio 120 may not be sufficiently precise to locate radios 120 and 125. In some cases, multipath interference caused by buildings or other structures may affect the accuracy of location estimates provided by GPS or assisted GPS. For example, the GPS location provided by first stage radio 120 may be in error by 10-30 yards.

Second stage radio 125 may be implemented as a radio that emanates a beacon. The beacon may include additional information, such as commands and status information. For example, a command from portable locator 110 may activate a second stage radio. In some implementations, the activation command from portable locator 110 may include the address of second stage radio 110, so that only the addressed second stage radio is activated from among a plurality of second stage radios. Moreover, in some implementations, the second stage radio may be implemented as a radio including a receiver and transmitter configured to transmit an RFID (Radio Frequency IDentification) tag in response to the beacon transmitted from portable locator 110. The second stage radio 125 may further include an antenna 127 for transmitting the beacon. The second stage radio 125 may also receive status information, commands, and an activation command to wake up second stage radio 125 from a dormant state.

The portable locator 110 may be used to send an activation command to activate second stage radio 125, receive the beacon from second stage radio 125, send one or more commands to control second stage radio 125 and/or first stage radio 120, and receive commands and/or status information from radios 120 and/or 125. In some implementations, portable locator 110 further includes a processor, such as a computer with a display, and an antenna 114, such as a directional antenna (e.g., a dish, horn antenna, or the like), although any antenna may be used. The use of a directional antenna may enhance location of the beacon and the corresponding second stage radio 125.

Figure 2:
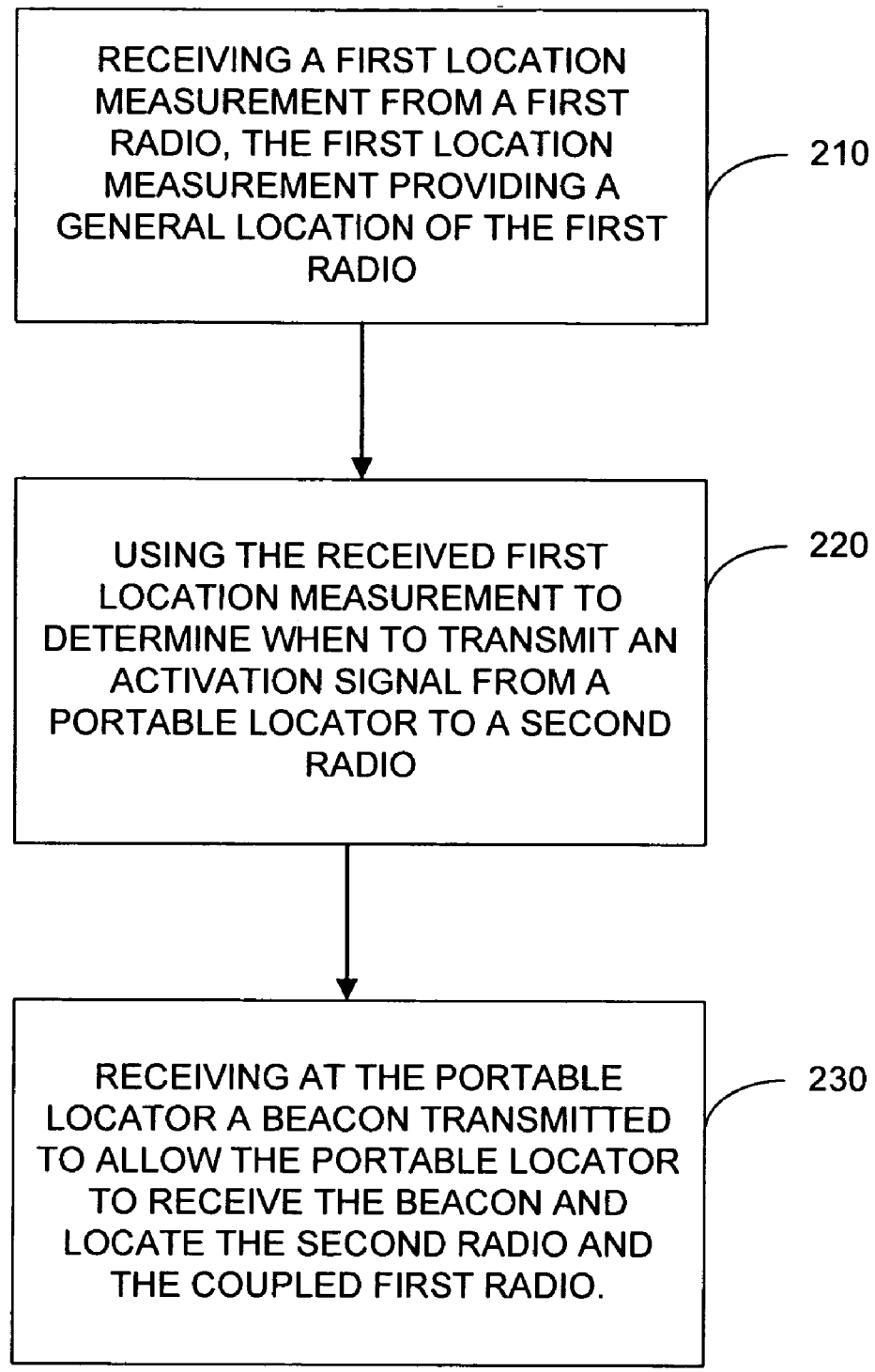
FIG. 2 illustrates a flow chart for receiving a beacon that enables the locator to locate the second radio and a coupled first radio.

FIG. 2 depicts a flowchart for location based on the two-stage radio system. The first and second stage radios 120 and 125 may be at an unknown location. When that is the case, first stage radio 120 may send a location measurement indicative of the position of the first stage radio 120 as well as the coupled second stage radio 125. The location measurement may be received at computer 160 and then relayed (e.g., through network 150) to portable locator 110 (step 210). The received first location measurement provides a general location measurement for first stage radio 120 and the coupled second stage radio 125.

Although computer 160 is depicted as separate from portable locator 110, the portable locator may include computer 160. Moreover, computer 160 may function as a controller or an operation center for one or more two stage radio systems.

The first location measurement may then be used to determine a more precise location for first stage radio 120 and the coupled second stage radio 125. In particular, the first location measurement may provide an initial location from where portable locator 110 may begin its search by transmitting an activation command to wake up the second stage radio (step 220). When the activation command is received at second stage radio 125, second stage radio 125 may terminate its dormant state and begin transmitting a beacon (or, alternatively, increase the power of its beacon). A dormant state may be characterized as a power saving condition, which in some instances includes varying (or temporality suspending) the transmission of the beacon. In some cases, second stage radio 125 may not implement a dormant state, so the beacon may be emanating from second stage radio 125 before any activation command is received from portable locator 110.

The portable locator 110 receives the beacon (step 230). The portable locator 110 may then determine information indicative of the signal strength and direction of the beacon from second stage radio 125. When antenna 114 is a directional antenna, moving the antenna away from the direction of the second stage radio 125 may reduce the received signal power of the beacon. Also, moving the portable locator 110 closer to the second stage radio 125 may increase the received signal strength of the beacon.

In some embodiments, portable locator 110 may send a command to second stage radio 125 to vary the power, frequency, and/or address associated with the beacon to further facilitate locating second stage radio 125.

By way of example, a user of portable locator 110 may receive a first location measurement from first stage radio 120 that generally identifies a twelve story apartment building (step 210). The first location measurement from first stage radio 120 may be received at computer 160 over network 150 and then relayed by any means to portable locator 110. Portable locator 110 may include a display and/or a processor (e.g., a computer) capable of receiving and/or displaying the first location measurement. Based on that first measurement, portable locator 110 may be placed in or near the twelve story building identified by the first location measurement provided by first stage radio 120. The portable locator 110 may then emanate an activation command to activate (or wake up) second stage radio 125 (step 220). A user of the portable locator 110 can then vary the position of locator 110 as well as the direction of antenna 114 so that the signal strength of the beacon varies (e.g., increases). For example, a user of portable locator 110 may walk in a direction that indicates increasing signal strength of the beacon. Similarly, a user of the portable locator 110 can vary the direction of antenna 114 and walk in a direction corresponding to the increasing beacon signal strength. By moving in the direction of the greatest signal strength, at some point the beacon of second stage radio 125 is located.

Figure 3:
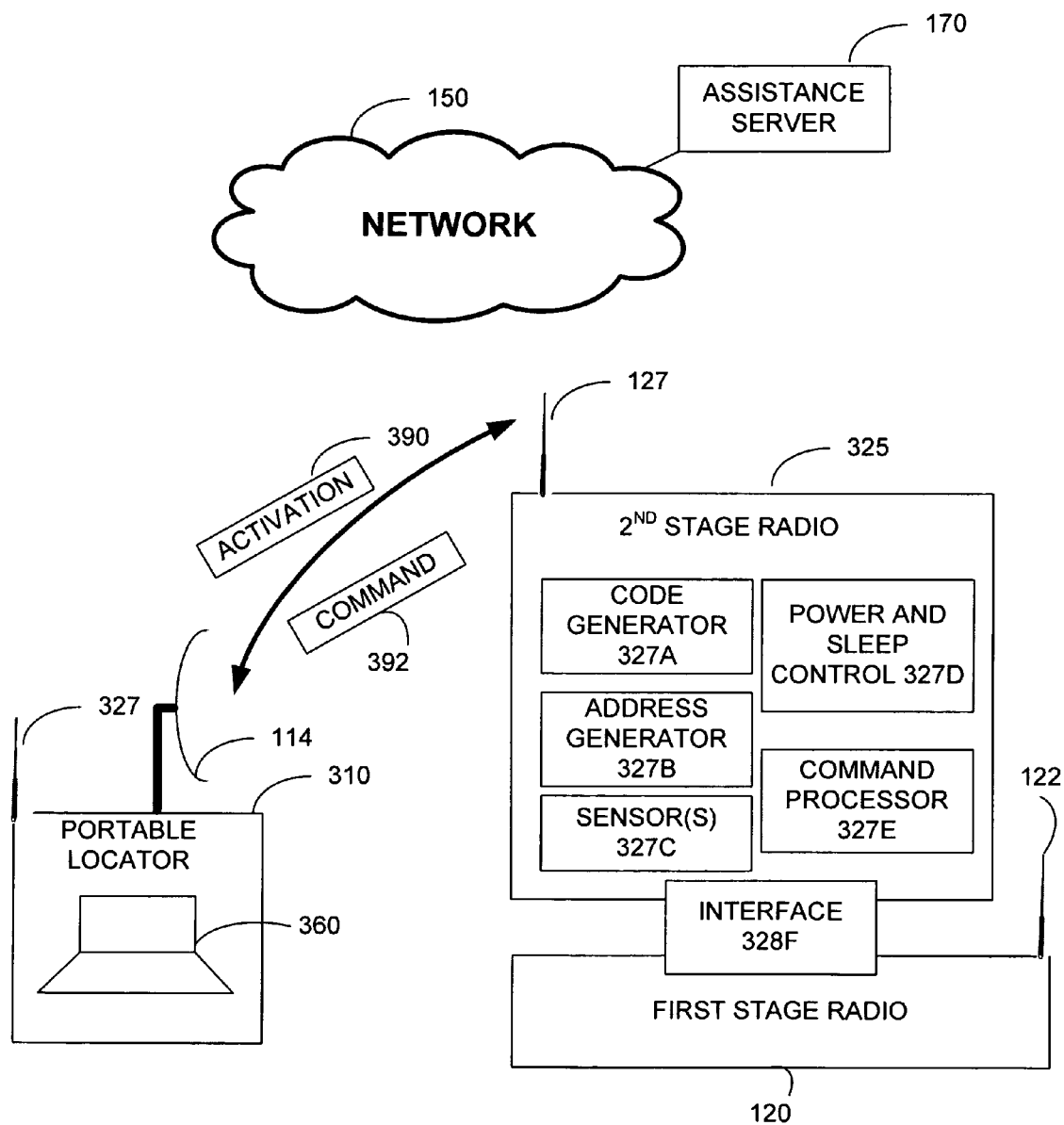
FIG. 3 illustrates another block diagram of a two-stage location system including a locator.

FIG. 3 depicts another system 300 for performing two-stage location. The system 300 is similar to system 100 (FIG. 1) but includes additional features as described below.

The second stage radio 225 is similar to second stage radio 125, but further includes a code generator 327*a*, an address generator 327*b*, one or more sensors 327*c*, a power and sleep controller 327*d*, a command processor 327*e*, and an interface 328*f*.

The code generator 327*a* generates codes that may be used to distinguish between a plurality of second stage radios 325. For example, code generator 327*a* may generate a pseudo-noise (PN) code, which may be used to scramble or spread the beacon of second stage radio 325.

The address generator 327*b* generates an address, such as a media access control address, for second stage radio 325.

The second stage radio 325 may also include one or more sensors 327*c*. The sensors 327*c* may measure and/or gather status information, such as the status of second stage radio 325 and/or first stage radio 120. Examples of status information include: battery life of radios 325 and 120; temperature measurements; configuration of second stage radio; and presence and/or status of neighboring radios. The sensors may also include a microphone and/or a digital camera.

The power and sleep controller 327*d* enables second stage radio 325 to enter into a lower power state, such as a dormant state. The lower power state may include one or more of the following features: suspending transmission of the beacon and suspending other functions at second stage radio 325.

The command processor 327*e* processes commands from other devices, such as portable locator 310 and first stage radio 120. In some implementations, command processor 327*e* processes commands to vary the power of the beacon, such as increasing, decreasing, or terminating the beacon power. Other commands may include one or more of the following: turning on a microphone to record audio and turning on a camera to take pictures or video.

The interface 328*f* provides an interface between radios 120 and 325 to allow the exchange of information, such as location information, status information, and/or commands. For example, a second stage radio may relay to portable locator 110 that another second stage radio has low power or a weak battery.

The portable locator 310 is similar to portable locator 110, but further includes a processor 360 (e.g., a computer) capable of processing and presenting information from the first and second stage radios. In some implementations, processor 360 presents location information from first and second stage radios 120 and 325. In addition, processor 360 may enable selection of one or more commands to send to first and second stage radios 120 and 325 and process any commands and/or status information sent from first and second stage radios 120 and 325 to portable locator 310.

Figure 4:
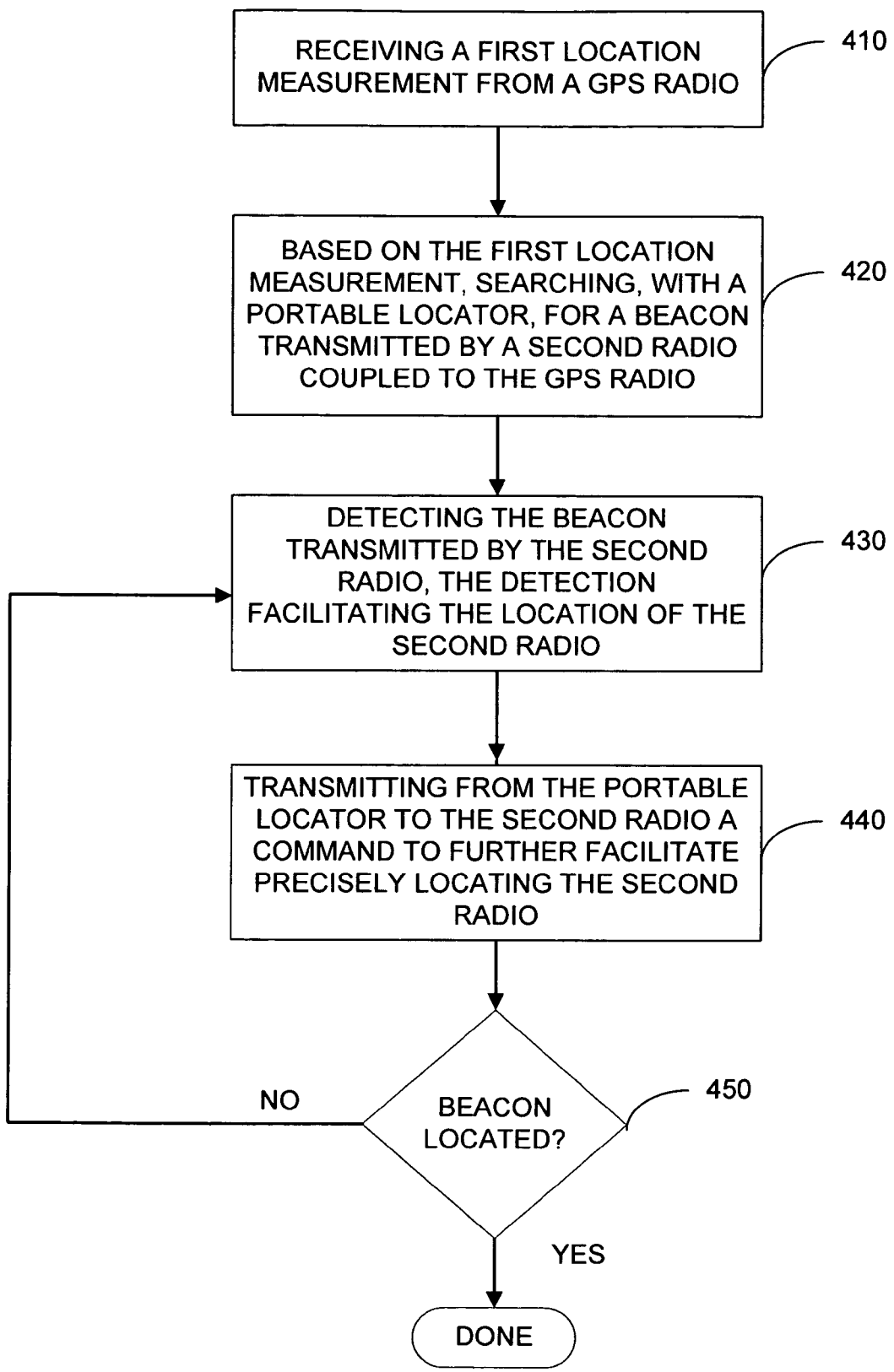
FIG. 4 illustrates a flow chart for sending commands from the locator to the second radio to facilitate location of the second radio and a coupled first radio.

FIG. 4 depicts a flowchart for locating first and second stage radios 120 and 325. Referring to FIG. 4, portable locator 360 may receive a first location measurement from first stage radio 120 (step 410). The first location measurement may be a GPS or an assisted-GPS location measurement provided to portable locator 310 through network 150 and antenna 327.

The first location measurement may then be presented at portable locator 310 so that portable locator 310 may be positioned to locate the beacon transmitted by second stage radio 325 (step 420). In some instances, portable locator 310 may present the first location measurement on a display at processor 360.

The portable locator 110 may then detect the beacon transmitted by second stage radio 325 (step 430). The portable locator 110 may then transmit a command (e.g., activation command 390) to second stage radio 325 to assist in precisely locating the second stage radio 325 (step 440). In some cases, portable locator 110 may send a command (e.g., command 392) instructing second stage radio 325 to vary, such as increase, its power to facilitate detection of the beacon. Once the beacon is detected by portable locator 310, a user can vary the position of portable locator 310 as well as the direction of antenna 114 so that the signal strength of the beacon increases further. For example, the user of portable locator 310 may move in the direction of the beacon. By moving in the direction of the greatest beacon signal strength as determined by moving towards the beacon or moving the direction of antenna 114, portable locator 310 precisely finds the source of the beacon of the second stage radio.

In some cases, if the signal strength of the beacon exceeds a threshold, portable locator 310 may send a command to decrease the beacon's power to facilitate location.

In some implementations, when second stage radio 325 is located, portable locator 310 sends through network 150 a second location measurement to a computer (serving as a controller). The computer enables the second location measurement as well as the first location measurement to be mapped and tracked. For example, a user can monitor at the computer the location of first and second radios 120 and 325, and when one of the first or second location measurements indicates that the locations is not within a predefined region, the computer may indicate that to the user. For example, if the first and second radios are placed on a truck, the computer may monitor any location measurements associated with those radios and alarm if the first or second locations indicate that the truck has left a region, such as a street, city, county, state, or country.

In some implementations, the portable locator 310 and coupled computer 360 operate with and/or control a plurality of first and second radios.

In another example of the use of the first and second stage radios, the first and second radios can be placed on laboratory equipment used to make illegal drugs. In this implementation, portable locator 310 or computer 360 may receive a first location measurement from first stage radio 120. The first location measurement may be a GPS or an assisted-GPS location measurement provided to portable locator 310 or computer 360 through network 150 and antenna 327. The first location measurement may facilitate portable locator 310 to be positioned in a location that can detect the beacon transmitted by the second stage radio 325 (step 420). For example, the first location measurement may indicate that the illegal laboratory equipment may be located in a building, such as a warehouse or a hotel, enabling the portable locator to be placed near the building to find the precise location of the laboratory equipment. Once the beacon is detected by portable locator 310, a user can vary the position of portable locator 310 as well as the direction of antenna 114 so that the signal strength of the beacon increases further. The user of portable locator 310 may then continue moving in the direction of the beacon until portable locator 310 precisely finds the source of the beacon of the second stage radio 310.

In one implementation, portable locator receives location information indicating that the first stage radio is at a first location, such as a building. The portable locator is then placed in the vicinity of the first location (e.g., in the building). The portable locator 110 then transmits an activation command to activate the second stage radio coupled to the first stage radio. Meanwhile, a controller (e.g., a control application at computer 160) receives an indication from the second stage radio that it has not been activated and that it has not detected the portable locator. If another second stage radio detects the portable locator, the controller may forward that information including the location of that other radio to the portable locator to enable the portable locator to modify its search. In addition, the controller may request the location of the portable locator and then provide information to the portable locator to allow it to modify its search. For example, the controller may provide information to allow the portable locator to search for the second stage radio in another location, such as in an adjacent building.

In some implementations, a plurality of second stage radios may be used. When that is the case, the portable locator may determine that a plurality of second stage radios are in the vicinity of the portable locator. For example, the portable locator may send a command to each second stage radio to register with the portable locator. Alternatively, each second stage radio may wake up from a dormant state and transmit identifying information, such as a Media Access Control (MAC) address. In some implementations that include a plurality of radios, collision avoidance techniques, such as carrier sense multiple access or the like, may be used to avoid collisions between beacons. Moreover, the portable locator may locate a particular second stage radio from among a plurality of second stage radios by sending an activation command including identifying information (e.g., a MAC address) of the particular second stage radio being located. Furthermore, the portable locator may send another command to activate a light (e.g., an infrared light) or a sound (e.g., an audible or inaudible tone) at the second stage radio. The light or sound may further enable location of the second stage radio from among a plurality of radios.

Although the above example describes locating laboratory equipment used in the manufacture of illegal drugs, the portable locator and first and second radios may be used to locate any object, such as criminals, sex-offenders, parolees, firefighters, police officers, and goods. Moreover, although the above examples describe using GPS, any location system may be used.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A method comprising:
receiving a first location of a first radio, the first radio providing the first location of the first radio;
using the received first location to determine when to transmit an activation command from a portable locator to a second radio, the second radio coupled to the first radio, the activation command varying at least one of a power and a frequency of a beacon transmitted by the second radio; and
receiving at the portable locator the beacon transmitted to enable the portable locator to precisely locate the second radio and the coupled first radio.

2. The method of claim 1, wherein receiving the first location further comprises:
receiving the received first location as a location determined from a global positioning system.

3. The method of claim 1, wherein receiving the first location further comprises:
receiving the first location from a wireless device including a global positioning system (GPS) engine, the first location determined with information provided by an assisted GPS server.

4. The method of claim 1 further comprising:
transmitting the beacon as a signal in an ISM (Industry, Scientific, and Medical) band.

5. The method of claim 1, wherein receiving the beacon further comprises:
receiving an address of the second radio, the address comprising one or more of the following: a media access control address and an electronic serial number (ESN).

6. The method of claim 1, further comprising:
implementing a dormant state to conserve power at the second radio.

7. The method of claim 1, further comprising:
sending a command from the portable locator to the second radio, the command activating a sound to facilitate location of the second radio.

8. The method of claim 1, further comprising:
using a directional antenna at the portable locator to facilitate location of the second radio.

9. The method of claim 1 further comprising:
sending, from the portable locator, a second location of the second radio, when the second radio is precisely located by the portable locator.

10. The method of claim 9, further comprising:
mapping, at a computer, the first location and the second location, and tracking the first and second locations to determine when at least one of the first location and the second location are not within a predefined region.

11. A system comprising:
a first radio for providing a first location;
a second radio for sending a beacon when activated by an activation command, the second radio coupled to the first radio, such that the first location corresponds to the first and second radios, the activation command varying at least one of a power and a frequency of a beacon transmitted by the second radio; and
a portable locator for sending the activation command to the second radio, and for receiving the beacon, the beacon transmitted by the second radio to enable the portable locator to locate the first and second radios.

12. The system of claim 11, wherein the first location further comprises a location determined based on a global positioning system.

13. The system of claim 11, wherein the first location further comprises location information determined based on information provided by an assisted global positioning system (GPS) server.

14. The system of claim 11, wherein the beacon further comprises an address of the second radio, the address comprising one or more of the following: a media access control address and an electronic serial number (ESN).

15. The system of claim 11, further comprising:
a speaker to generate a sound in response to a command from the portable locator.

16. The system of claim 11, further comprising:
a directional antenna at the portable locator to facilitate location of the second radio.

17. The system of claim 11, further comprising:
a computer for mapping the first location and the second location, and for tracking the first and second locations to determine when at least one of the first location and the second location are not within a predefined region.

18. A two-stage radio comprising:
a first radio for providing a first location; and
a second radio for sending a beacon when activated by an activation command from a portable locator, the activation command varying at least one of a power and a frequency of the beacon transmitted by the second radio, the second radio coupled to the first radio, such that the first location corresponds to the first and second radios, the beacon transmitted by the second radio to enable the portable locator to locate the first and second radios.

19. The two-stage radio of claim 18, wherein the beacon further comprises an address of the second radio, the address comprising one or more of the following:
a media access control address and an electronic serial number (ESN).

20. The two-stage radio of claim 18, further comprising:
a speaker to generate a sound in response to a command from the portable locator.

21. A portable locator comprising:
a directional antenna;
a transmitter for sending an activation command from a portable locator to a second radio and a coupled first radio, the activation command varying at least one of a power and a frequency of a beacon transmitted by the second radio; and
a receiver for detecting through the direction antenna the beacon transmitted to enable the portable locator to precisely locate the second radio and the coupled first radio.

* * * * *